Aug. 7, 1934.   J. B. ARMITAGE   1,969,392
ARBOR SUPPORT FOR MILLING MACHINES
Filed May 4, 1931

INVENTOR
Joseph B Armitage
BY
Fred A Parsons
ATTORNEY

Patented Aug. 7, 1934

1,969,392

UNITED STATES PATENT OFFICE 1,969,392

ARBOR SUPPORT FOR MILLING MACHINES

Joseph B. Armitage, Wauwatosa, Wis., assignor to Kearney & Trecker Corporation, West Allis, Wis.

Application May 4, 1931, Serial No. 534,754

3 Claims. (Cl. 90—18)

This invention relates to milling machines and more particularly to the cutter supporting structure of such machines.

Cutters are ordinarily supported on arbors fixed with the machine spindle and frequently are in gangs in which individual cutters are spaced apart on the arbor by the means of collars or sleeves, the spacing ordinarily requiring considerable accuracy.

The arbor is ordinarily a relatively slender member providing comparatively little strength to resist the side thrust set up by the cutters and is supported at the one end by being fixed with the spindle and at the other end by the means of a pendant providing a bearing within which one of the arbor collars rotates, the pendant being fixed on an overarm structure which in turn is fixed with the column of the machine. It is frequently desirable to support the arbor at intermediate points by the means of similar pendants.

When the cutters are dull they must be removed from the machine for grinding. This requires that the pendants be removed to the extent at least of permitting the cutters to be pulled off the arbor, or of permitting the arbor and cutters to be removed as a unit, which is sometimes desirable so that several cutters may be ground as a unit in order to establish the exact spacing of different cutters of a gang. The pendant supporting the outer end of the arbor may be readily removed, but intermediate pendants frequently cannot be removed without disassembly of some of a gang of cutters from the arbor, since the relatively small bore in the pendant which provides the bearing for the sleeve on the arbor will not permit of the cutters being passed through the bore.

It is a purpose of the invention to provide an improved pendant for the support of milling machine arbors which may be removed to permit the unitary removal of a gang of cutters with the arbor. This is particularly advantageous for intermediate pendants, but may also be of advantage for any pendants.

Another purpose is to provide a pendant such as just mentioned, particularly suited for cooperation with an overarm device of the so-called double overarm type.

Another purpose is generally to simplify and improve the construction and operation of supports for the projecting arbors of milling machines.

The invention resides in the construction and combination of parts as herein illustrated, described and claimed, and in such modifications thereof as may be equivalent to the claims.

Like reference characters indicate the same parts throughout the specification and accompanying drawing, in which.

Figure 1:
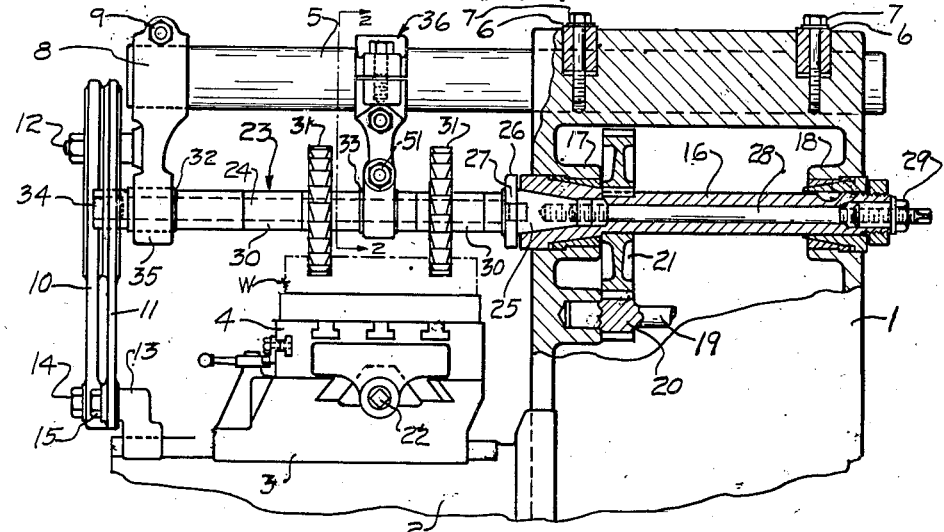
Fig. 1 is a right-side view of a portion of a milling machine partly in section and showing the improved pendant in operative position thereon.

As shown in Fig. 1, the machine illustrative of the invention comprises a column 1 supporting for vertical adjustment thereon a knee 2, the knee carrying a slidable saddle 3 on which is slidably mounted a work table 4. The column has slidably mounted therein a pair of overarms 5—5 capable of longitudinal adjustment in well-known manner and adapted to be fixed in adjusted position in the column by means of suitable clamping members 6—6 movable in suitable slots in the column and forced downwardly by means of clamping screws 7—7. Overarms 5—5 may carry at their outer extremities a pendant 8 of any suitable form which in the present instance is clamped with the overarms by means of a bolt 9 in any suitable well-known manner. The pendant and overarms may be rigidly supported and braced from knee 2 when desired by means of a harness composed of members 10 and 11 fixed with pendant 8 by any suitable means such as bolt 12 and fixed at their lower ends with a member 13 by means of bolts 14 and 15 respectively. Member 13 may be fixed with knee 2 by any suitable well-known means, not shown.

Column 1 supports therein for rotation a tool spindle 16 which is journaled in suitable bearings 17 and 18 and adapted to be driven from a suitable power source, not shown, through a transmission including a shaft 19 driving through a pinion 20 a gear 21 fixed with the spindle.

Suitable power trains are provided for moving table 4 terminating in a table screw, a squared end portion of which is shown at 22, but since such mechanism is well-known in the art and forms no part of this invention, it is not shown here.

Spindle 16 supports and drives a tool arbor generally denoted by 23 which may be of any suitable or well-known type, but in the present instance comprises an inner portion 24 provided at one end with suitable means for engaging spindle 16 including an enlarged tapered portion 25 adapted to fit into a complementary tapered socket in the spindle, the tapered portion being separated from portion 24 by means of a flange 26 adapted to receive the rotating force from the spindle through suitable driving keys such as 27 received in suitable complementary sockets in the spindle and flange. The arbor is rigidly retained in the spindle 16 by means of a draw bolt 28 passing axially through the spindle and threaded in a suitable bore formed in tapered portion 25. A nut 29 threaded on draw bolt 28 engages the rear end of spindle 16 for suitably tensioning the bolt. Collars such as 30—30 are slidably fitted on portion 24 and serve as a spacing means for axially locating cutters such as 31—31 and bearing sleeves 32 and 33, a nut 34 being threaded on the other end of portion 24 and serving to compress the various collars, cutters, and sleeves against each other and between it and flange 26, forming a unitary member which, as above noted, it is often desirable to keep assembled so that it may be placed in or removed from the machine intact.

The inner end of arbor 23 is maintained in desired position by its rigid engagement with spindle 16. The outer end is supported and braced against any lateral movement by means of a bearing 35 fixed with pendant 8 and cooperating with bearing sleeve 32. There may be, however, some tendency under the stresses developed by engagement of cutters 31—31 with a work piece (indicated as W) to lateral displacement of the middle portion of arbor 23 between bearing 35 and flange 26. To brace the arbor against such deflection a pendant 36 is provided supported on overarms 5—5 and engaging bearing sleeve 33 between cutters 31—31.

Figure 2:
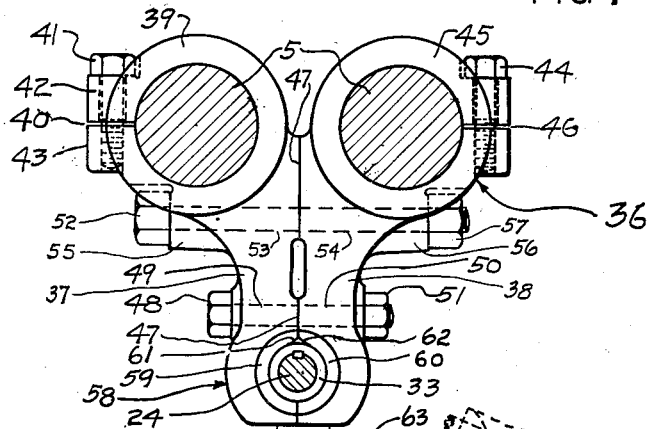
Fig. 2 is a front elevation of the improved pendant showing the overarms and tool arbor in cross section on the line 2—2 of Fig. 1.

As shown in Fig. 2, this pendant comprises two similar portions 37 and 38 each engaging one of overarms 5—5 and clamped thereto by any suitable means. In the present instance portion 37 has a ring-shaped member or clamping part 39 encircling one of overarms 5—5, a slot 40 being provided whereby the clamping part may be compressed into clamping relation with the overarm by means of a screw 41 rotatable in a lug 42 and threaded in a lug 43, the lugs being disposed on opposite sides of slot 40 as shown. A similar screw 44 is provided for compressing a clamping part 45 fixed with portion 38, such movement being allowed by means of a slot 46.

Portions 37 and 38 fit together along a surface 47 to form a substantially unitary symmetrical member, and may be held rigidly in abutting relation by any suitable means, in the present instance consisting of a bolt 48 passing through aligned bores 49 and 50 in the two portions and having a nut 51 engaging an outer surface of portion 38.

Bolt 48 is closely fitted in bores 49 and 50 and serves as a dowel for accurately locating members 37 and 38 with relation to each other.

For obviating any tendency for the half portions to separate in the region of overarms 5—5 through cutting stresses, distortion of the overarms, or the like, a second bolt 52 is provided passing through aligned bores 53 and 54 formed in the portions, suitable bosses 55 and 56 being arranged to accommodate the bores in well-known manner. Bolt 52 has a nut 57 engaging a suitable face of boss 56 for drawing the portions 37 and 38 together.

It is to be understood that various other means may be used in place of bolts 48 and 52 for holding the portions 37 and 38 together, the same being shown merely as typical of a variety of means which may fall within the scope of the claims.

Portions 37 and 38 are so constituted at their lower ends as to form the face of a bearing generally denoted by numeral 58, a continuation of surface 47 dividing the bearing as shown. A suitable bushing may be provided comprising the halves 59 and 60 fixed respectively in portions 37 and 38 and forming a suitable bearing surface for bearing sleeve 33 fixed, as above noted, on inner portion 24. Halves 59 and 60 are slightly cut away as shown at 61 and 62 to allow clearance for movement of portions 37 and 38, as will be presently apparent, and if desired, the lower extremities of portions 37 and 38 may be cut away as shown at 63 in order to allow close approach of arbor 23 to a work piece without interference from the pendant.

Figures 3, 4:
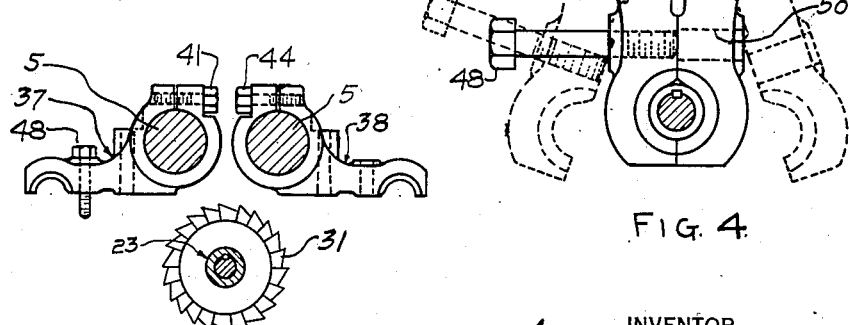
Fig. 3 is a similar view showing the pendant in position for removal of the arbor-cutter assembly.
Fig. 4 is a view of a portion of the pendant as shown in Fig. 2 showing a fastening means in disengaged condition.

When it is desired to remove arbor 23 from the machine, pendant 8 is moved out of the way in any suitable well-known manner, nut 29 is loosened, and draw bolt 28 is unscrewed from portion 25. Pendant 36 is then removed as follows: Nuts 51 and 57 are taken off bolts 48 and 52 respectively and the bolts are either removed from their respective bores or withdrawn to the position indicated in Fig. 4. Screws 41 and 44 are loosened so that portions 39 and 45 release their grip upon overarms 5—5 whereupon portions 37 and 38 may be separated and pivoted about overarms 5—5 into substantially the position shown in Fig. 3. It is then possible, as clearly indicated in this figure, to withdraw arbor 23 with cutters 31—31 undisturbed after which the cutters may be ground and the whole assembly replaced in the machine by merely reversing the above process. Similarly any other suitable assembly of cutters and arbor may be substituted for the particular arbor 23 whereby the set-up of arbor 23 may be preserved for use again at a later time. The fact that bolt 48 is fitted in bores 49 and 50 will insure the location of bearing halves 59 and 60 with sufficient accuracy to prevent any misalignment or binding in the bearing.

It will be apparent that owing to the disposition of the pivotal points of portions 37 and 38 relative to arbor 23, pivotal movement of the portions would result in a slight downward movement of the portions of bushing halves 59 and 60 immediately above bearing sleeve 33 and this might lead to difficulty in separating the pendant portions. The provision of cut-away portions 61 and 62 prevents any binding or interference at this point.

It will be readily understood that there has been provided an exceptionally advantageous brace for the mid-portion of a tool arbor adapted to give a particularly rigid support thereto, but that unlike devices of this class heretofore known, it may be readily moved when desired into a position entirely clear of the arbor and cutters thereon.

The above being a complete description of an illustrative embodiment of the invention, what is claimed is:

1. In a milling machine, the combination of a tool supporting column, a tool spindle rotatively supported from said column, an arbor fixed with said spindle and projecting therefrom, an overarm structure projecting from said column above said arbor and including two round bar members each parallel with the arbor axis, a bearing supported from said overarm structure and adapted to support said arbor against displacement transverse to the axis thereof, said bearing providing portions relatively movable in a direction transverse to the arbor axis, said portions being pivoted respectively on different of said bar members for support therefrom independently of the relative position, and means for rigidly fixing said portions together.

2. In a milling machine, the combination of a rotatable tool spindle, an arbor projecting therefrom, an arbor support including a plurality of round overarms each parallel with the axis of said arbor and spaced apart, a plurality of members separately formed and respectively pivoted on different of said arms, said members providing mutually cooperating surfaces adapted to contact therebetween to define the position of the members relative to the axis of said spindle and means for clamping said surfaces together.

3. In a milling machine, the combination of a spindle supporting structure, a tool spindle rotatably supported from said structure, a work table movable in a path transverse to the axis of said spindle, a tool arbor projecting from said spindle, a plurality of separately formed bearing portions associated with said arbor and respectively on opposite sides of the axis thereof in the direction of table movement, said portions being relatively movable to separate the portions in said direction, and means for rigidly positioning each of said portions in a position together to fix the alignment of said arbor in exact axial alignment with the axis of said spindle, said means including an overarm structure guided in said spindle supporting structure for movement in a direction parallel with said spindle axis.

JOSEPH B. ARMITAGE.

CERTIFICATE OF CORRECTION.

Patent No. 1,969,392.                                                             August 7, 1934.

JOSEPH B. ARMITAGE.

It is hereby certified that error appears in the printed specification of the above numbered patent requiring correction as follows: Page 3, line 5, claim 1, for "portious" read portions; and line 9, after "position" and before the comma, insert the words of the other portion; same page, line 18, claim 2, for "to" read for; and that the said Letters Patent should be read with these corrections therein that the same may conform to the record of the case in the Patent Office.

Signed and sealed this 11th day of September, A. D. 1934.

Leslie Frazer (Seal)                                                               Acting Commissioner of Patents.